US008849751B2

United States Patent
Weissenberger et al.

(10) Patent No.: US 8,849,751 B2
(45) Date of Patent: *Sep. 30, 2014

(54) PERSISTENCE OF MASTER DATA IN A MULTI-TENANT SOFTWARE DELIVERY ARCHITECTURE

(71) Applicants: Christof Weissenberger, Sinsheim (DE); Christoph Lehner, Heidelberg (DE); Gururaj Raman, Bad Schoenborn (DE); Wolfgang Nieswand, Muhlhausen (DE)

(72) Inventors: Christof Weissenberger, Sinsheim (DE); Christoph Lehner, Heidelberg (DE); Gururaj Raman, Bad Schoenborn (DE); Wolfgang Nieswand, Muhlhausen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,133

(22) Filed: Mar. 1, 2013

(65) Prior Publication Data

US 2013/0179399 A1 Jul. 11, 2013

Related U.S. Application Data

(63) Continuation of application No. 12/847,873, filed on Jul. 30, 2010, now Pat. No. 8,412,673.

(51) Int. Cl.
*G06F 17/00* (2006.01)
*G06F 7/00* (2006.01)
*G06Q 10/00* (2012.01)
*G06F 17/30* (2006.01)

(52) U.S. Cl.
CPC .......... *G06F 17/30174* (2013.01); *G06Q 10/00* (2013.01)
USPC ........... 707/610; 707/611; 707/617; 707/623; 709/209

(58) Field of Classification Search
None
See application file for complete search history.

(56) References Cited

U.S. PATENT DOCUMENTS

| 6,820,135 | B1 * | 11/2004 | Dingman et al. ............. 709/246 |
| 7,103,588 | B2 | 9/2006 | Beck et al. |
| 7,483,905 | B2 | 1/2009 | Gauweiler |
| 7,624,122 | B2 | 11/2009 | Gaurav et al. |
| 7,711,603 | B2 * | 5/2010 | Vanker et al. ................... 705/24 |
| 8,204,809 | B1 | 6/2012 | Wise |
| 2006/0195477 | A1 | 8/2006 | Deem et al. |
| 2006/0200533 | A1 | 9/2006 | Holenstein et al. |
| 2008/0162428 | A1 | 7/2008 | Gaurav |
| 2009/0193217 | A1 | 7/2009 | Korecki et al. |
| 2009/0254572 | A1 | 10/2009 | Redlich et al. |
| 2010/0161677 | A1 | 6/2010 | Zurek et al. |

* cited by examiner

*Primary Examiner* — Angelica Ruiz
(74) *Attorney, Agent, or Firm* — Mintz Levin Cohn Ferris Glovsky and Popeo, P.C.

(57) ABSTRACT

A first tenant-nonspecific database table on a repository accessible to an application server of a multi-tenant software delivery architecture can maintain a first record designating a first predefined generic field of a plurality of predefined generic fields. The first record can include an organization-specific master data field definition of the first predefined generic field maintained in a first tenant-specific definition field assigned to a first customer tenant of a plurality of customer tenants that are accessible via the application server. Each customer tenant of the plurality of customer tenants can provide a discrete organization-specific business configuration of a core software platform. A second tenant-nonspecific database table maintained on the repository can maintain a second record that can include a key value designating the first tenant, a record designator, and an organization-specific master data value corresponding to the first predefined generic field. A calculation or determination based on master data can be performed that is relevant to the discrete organization-specific business configuration provided by the first customer tenant using the organization-specific master data value.

20 Claims, 7 Drawing Sheets

| Tenant | Minimum Order Size | Maximum Order Size | Price Per Unit | Customer | Relationship Discount |
|---|---|---|---|---|---|
| 1 | 1 | 15 | $4.50 | | |
| 1 | 16 | 50 | $4.25 | | |
| 1 | 51 | 100 | $4.00 | | |
| 1 | 101 | 9999 | $3.75 | | |
| 2 | | | | ABC | 5% |
| 2 | | | | DEF | 0% |
| 2 | | | | GHI | 10% |
| 2 | | | | JKL | 8% |

*FIG. 4*

| Tenant or Key Value | Table Index | Generic 1 | Generic 2 | Generic 3 | Generic ... | Generic m |
|---|---|---|---|---|---|---|
| 1 | 1 | 1 | 15 | $4.50 | | |
| 1 | 2 | 16 | 50 | $4.25 | | |
| 1 | 3 | 51 | 100 | $4.00 | | |
| 2 | 1 | ABC | 5% | | | |
| 2 | 2 | DEF | 0% | | | |
| 2 | 3 | GHI | 10% | | | |
| 2 | 4 | JKL | 8% | | | |
| 1 | 4 | 101 | 9999 | $3.75 | | |
| ... | | | | | | |
| n | | | | | | |

*FIG. 6*

PERSISTENCE OF MASTER DATA IN A MULTI-TENANT SOFTWARE DELIVERY ARCHITECTURE

CROSS-REFERENCE TO RELATED APPLICATIONS

This patent application is a continuation of and claims the benefit of priority under 35 U.S.C. 120 of U.S. patent application Ser. No. 12/847,873, filed Jul. 30, 2010, entitled "PERSISTENCE OF MASTER DATA IN A MULTI-TENANT SOFTWARE DELIVERY ARCHITECTURE", now issued as U.S. Pat. No. 8,412,673, the disclosures of which are incorporated herein by reference in their entirety for all purposes.

TECHNICAL FIELD

The subject matter described herein relates to persistence of master data in a multi-tenant software delivery architecture.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

SUMMARY

In one aspect, a computer-implemented method includes maintaining, in a first tenant-nonspecific database table on a repository accessible to an application server of a multi-tenant software delivery architecture, a first record designating a first predefined generic field of a plurality of predefined generic fields. The first record includes an organization-specific master data field definition of the first predefined generic field maintained in a first tenant-specific definition field assigned to a first customer tenant of a plurality of customer tenants that are accessible via the application server. Each customer tenant of the plurality of customer tenants provides a discrete organization-specific business configuration of a core software platform. In a second tenant-nonspecific database table maintained on the repository, a second record is maintained that includes a key value designating the first tenant, a record designator, and an organization-specific master data value corresponding to the first predefined generic field. A calculation or determination based on master data is performed. The calculation or determination is relevant to the discrete organization-specific business configuration provided by the first customer tenant using the organization-specific master data value.

In some variations one or more of the following can optionally be included. The master data table can include a master data record having at least one master data field. The at least one master data field can include the organization-specific master data value. The first customer tenant can be moved to a second multi-tenant software architecture that can include a second application server and a second repository. The moving can include moving the first tenant-specific generic field definition field from the first tenant-nonspecific database table on the repository to a target first tenant-nonspecific database table on the second repository, extracting the second record and any other records in the second tenant-nonspecific database table having key values designating the first tenant from the second tenant-nonspecific database table, and adding the extracted second record and any other records to a target second tenant-nonspecific database table on the second repository. The first customer tenant can be copied to a second customer tenant on the multi-tenant software architecture. The copying can include creating a copy of the first tenant-specific generic field definition field in the first tenant-nonspecific database table, duplicating the second record and any other records in the second tenant-nonspecific database table having key values designating the first tenant in the second tenant-nonspecific database table, and changing the key values of the duplicated second record and any other records to designate the second customer tenant. The first customer tenant can be deleted from the multi-tenant software architecture. The deleting can include deleting the first tenant-specific generic field definition field from the first tenant-nonspecific database table on the repository to a target first tenant-nonspecific database table on the second repository and deleting the second record and any other records in the second tenant-nonspecific database table having key values designating the first tenant from the second tenant-nonspecific database table. The calculation or determination based on master data can include a pricing calculation.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein can, in various implementations, provide one or more advantages. For example, lifecycle management tasks associated with providing multiple customized instances of a core software platform to a variety of different organizations, each having different business processes, can be handled in a streamlined and automated manner. Manual reconfiguration of extensions and database fields added to support an organization-specific business process can be avoided or at least reduced by maintaining metdata describing the organization-specific master data of each organization supported by a multi-tenant system in a single, generic persistency. Access to this generic persistency can be provided to a user or users at each organization as though it is maintained in a custom, stand-alone database despite the underlying structure that is designed for maximum compatibility between customer tenants and multiple systems hosting instances of the multi-tenant architecture.

It should be noted that, while the descriptions of specific implementations of the current subject matter discuss delivery of enterprise resource planning software to multiple organizations via a multi-tenant system, the current subject matter is applicable to other types of software and data services access as well. Furthermore, all discussions of possible user interface interactions in the following description of various implementations of the current subject matter are intended to be merely illustrative and completely non-limiting. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows one approach to retaining organization-specific master data in a multi-tenant architecture;

FIG. 6 shows an example of a second tenant-nonspecific database table for storing organization-specific master data in a multi-tenant architecture according to an implementation.

When practical, similar reference numbers denote similar structures, features, or elements.

DETAILED DESCRIPTION

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple customer tenants on a single system that includes multiple servers and that maintains data for all of the multiple customer tenants in a secure manner while also providing customized solutions that are tailored to the business processes of the organization that is provided a customized software solution by each of the customer tenants.

In such a system, it can be desirable to maintain data pertaining to each of the multiple customer tenants using database structures that are as efficient as possible. Each of the multiple customer tenants in a multi-tenant system is likely to have a different business configuration that is customized to the specific business processes of the organization to which that customer tenant is assigned. As a consequence, each of the multiple customer tenants would require its own set of database tables with customized field identifiers and the like. Such an arrangement can be quite cumbersome and unwieldy, particularly during database maintenance, lifecycle management events such as updates or upgrades, and customer tenant move operations (for example if a customer tenant is to be ported from one physical system to another).

An illustrative example of a situation in which the current subject matter can be helpful is an instance of an organization that defines prices for its good or services based an organization-specific business purpose, pricing strategy, etc. The organization may therefore have pricing-related or other master data that includes flexibility to support arbitrary combinations of price relevant attributes. Master data generally include data having relatively static values and describing organization-specific business processes. For example, a discount per unit may be offered to a customer who purchases a number of units over a threshold number. The threshold and the amount of the discount to be offered can be stored as master data. Alternatively, estimated production and delivery times may be calculated based on a location of a nearest distribution center relative to the customer delivery location. Distribution center locations, expected production times or restocking times or frequencies for the distribution center, frequency of delivery truck pick-ups, and the like can all be stored as master data that can be organization specific.

Figure 1:
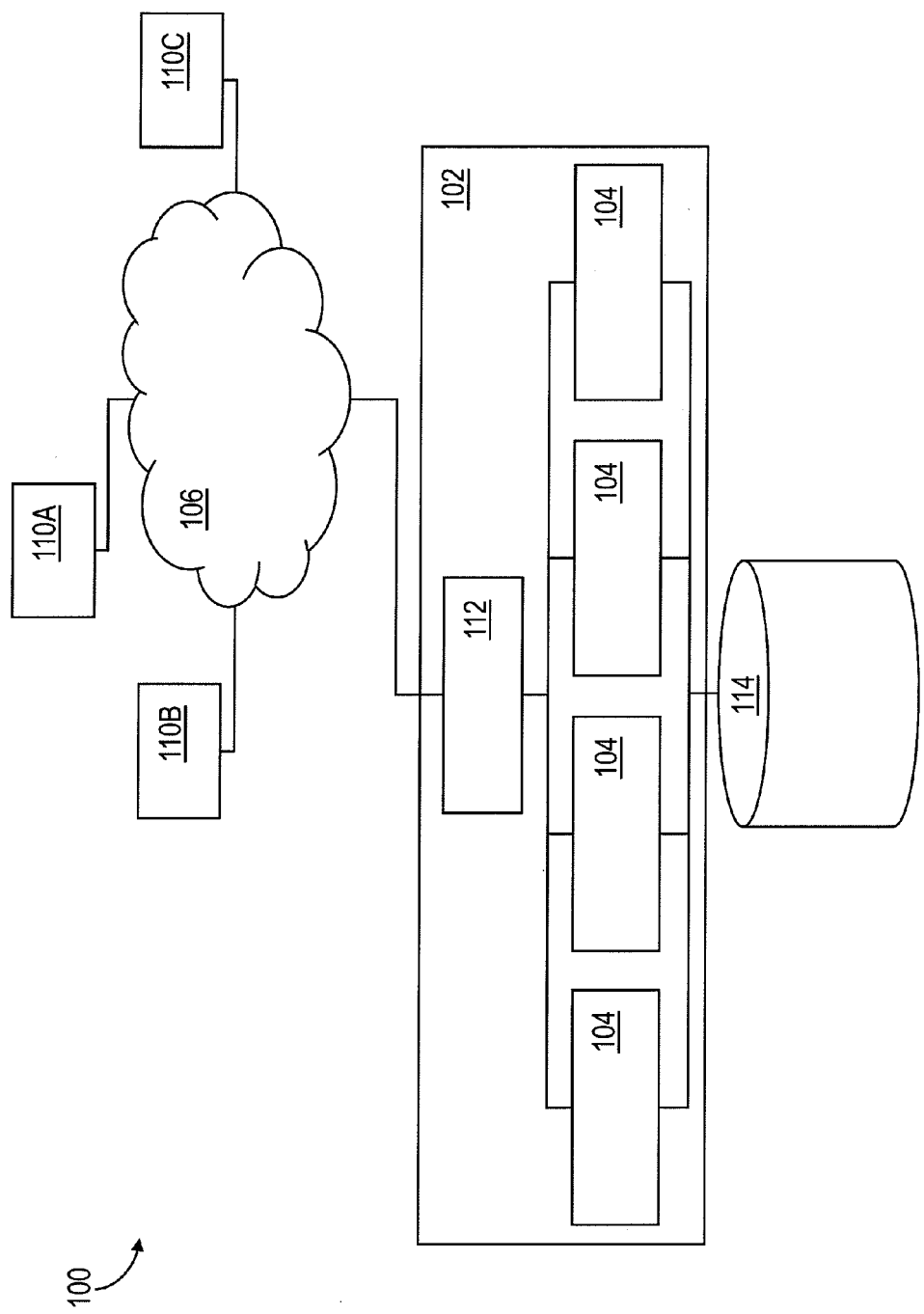
FIG. 1 is a diagram showing an example of a multi-tenant approach to providing customized software services to multiple organizations from a single architecture.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. One example of such a software delivery architecture can include features similar to those of the Business ByDesign™ software available from SAP AG (Walldorf, Germany). For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
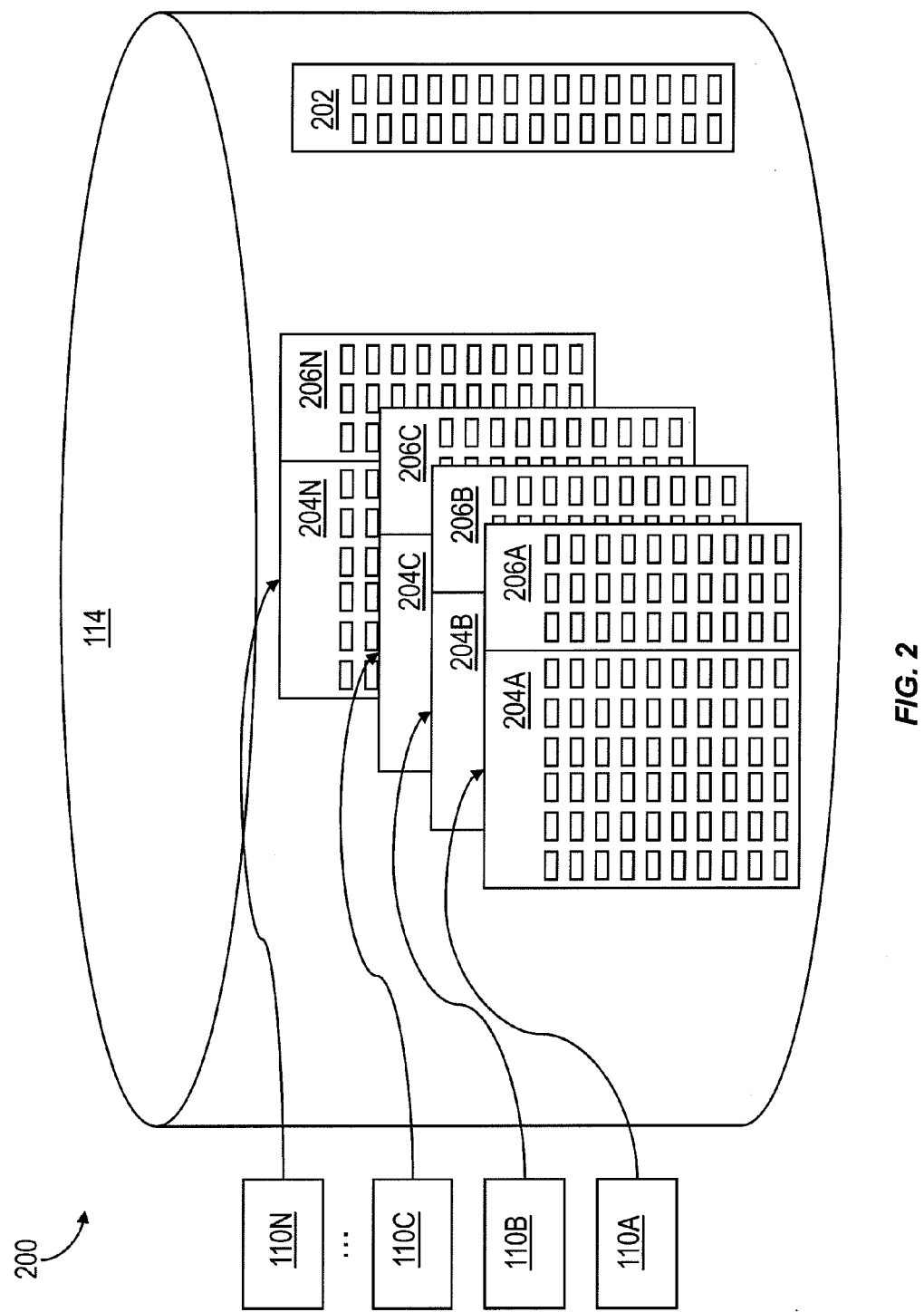
FIG. 2 is a diagram showing storage of both core software package data objects and tenant-specific data objects for each of multiple tenants of a multi-tenant system.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and tenant content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an ERP system that includes inventory tracking functionality, the system content 204A-204N can include data objects for labeling and quantifying inventory. The data retained in these data objects are tenant-specific: for example, each tenant 110A-110N stores information about its own inventory. Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values. A combination of the software platform content 202 and system content 204 and tenant content 206 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 112. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

Content separation in a multi-tenant environment is crucial to being able to support multiple discrete organizations from a single architecture. Tenant lifecycle operations such as updating or upgrading the core software platform, copying of a customer tenant (for example to test a new configuration or for periodic backups), moving of a customer tenant to a different physical system (for example to better distribute processing resource consumption among two or more physical systems operating the multi-tenant architecture), deletion of a customer tenant, etc. can introduce substantial overhead if each customer tenant includes customized tables, field names, and the like to contain the organization-specific master data of each organization. As updates, upgrades, etc. to the core software platform can include changes to underlying data objects and the like that can impact the format of such custom tables in a variety of ways, lifecycle management events can require significant pre-processing or post-processing steps to ensure ongoing compatibility of an organizations customized data structures that can be a major source of increased cost of ownership in a customized software delivery model based on a multi-tenant architecture. Accordingly, a more generic approach to storing customized master data fields for each customer tenant in a multi-tenant system is desirable.

Aspects of the current subject matter can provide a generic persistence for customer-specific master data, which can include but are not limited to price-related master data. An administrator, key user, regular user, or the like at an organization can define organization-specific master data attributes and attribute combinations that can be stored using a database table for master data that contains generic fields and that has a same standardized format as the database table for master data of each other customer tenant of a multi-tenant system. Because of this identical format for the database table for master data for each customer, lifecycle management events can be handled in a more automated fashion and with a much lower likelihood of errors being introduced by changes to underlying data objects and structures. Accordingly, the total cost of ownership of a SaaS-delivered customized software solution can be significantly reduced.

Figure 3:
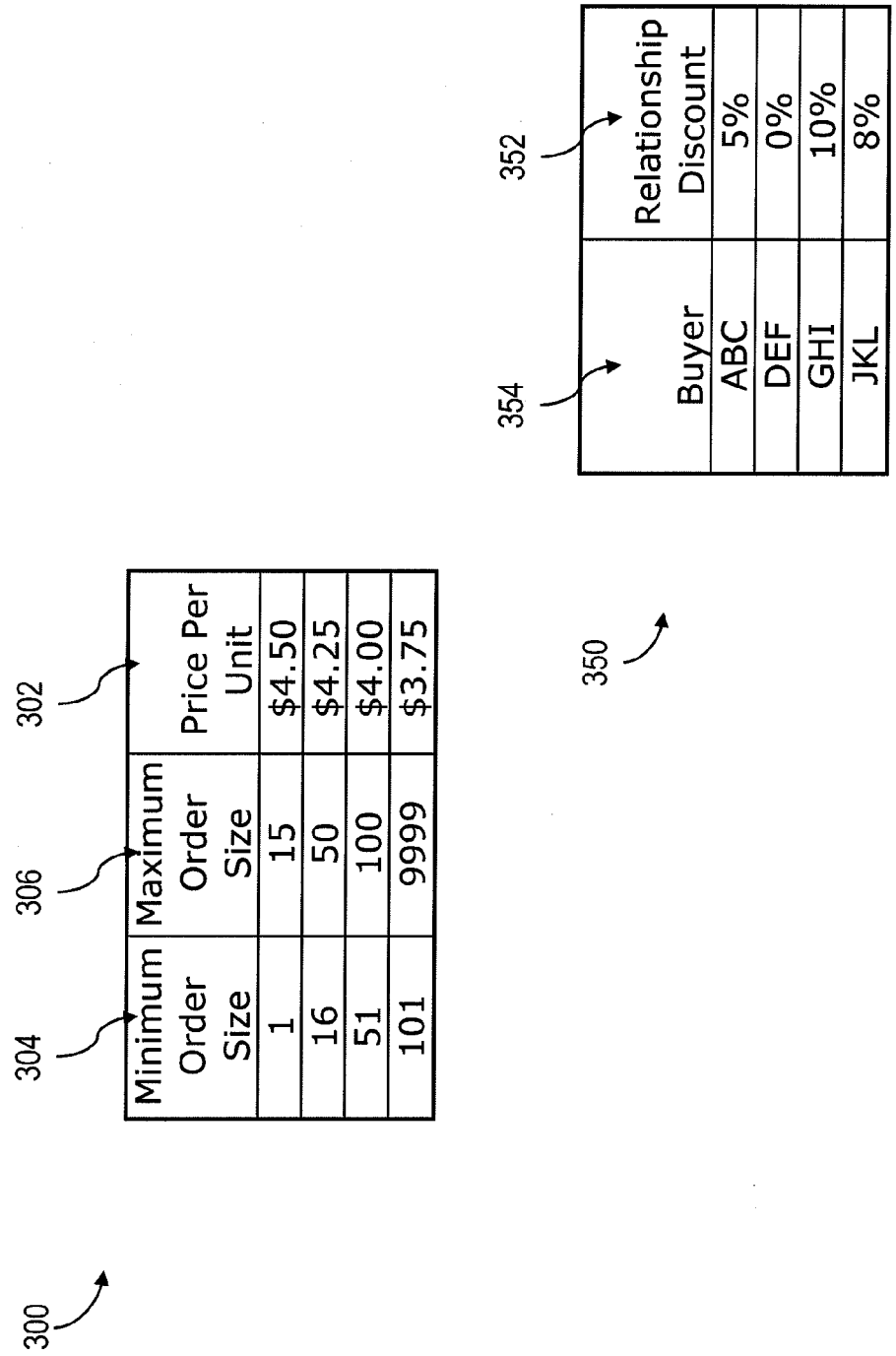
FIG. 3 shows examples of master data tables as they might be presented to tow different organizations to support organization-specific master data.

FIG. 3 shows two illustrative examples 300 and 350 of master data database tables for a first organization and a second organization. The master data presented in the tables relates to organization-specific pricing. Master data relating to aspects of an organization's operations other than pricing are also within the scope of the current subject matter. Table 300 as shown in FIG. 3 includes master data for determining pricing per unit 302 of merchandise in an order depending on which range of minimum number of units 304 and maximum number of units 306 the number of units in the order lies within. In an alternate pricing scheme shown in the second table 350, a buyer-specific relationship discount 352 is given to specific buyers 354 depending on that buyer's identity.

From the perspective of a user at the first organization, the first master data table 300 is what should be provided to support the customized software solution tailored to the business process or business configuration needs of the first organization. Users at the first organization should have no access to the second table 350 or its contents. However, from the perspective of a user at the second organization, the second master data table 350 is what should be provided to support the customized software solution tailored to the business process or business configuration needs of the second organization. Users at the second organization should have no access to the first table 300 or its contents.

Maintenance of separate tables with different field names for each of the first organization and the second organization can be unwieldy and can lead to significant additional record keeping requirements and maintenance work, particularly whenever a system change (such as an upgrade or update) needs to occur. An alternative approach is to append the tenant-specific extension fields to a database table that contains tenant-independent fields as well as tenant-specific fields. As shown in FIG. 4, such a table 400 can include a key value field 402 that identifies the tenant to which the individual records are related. Also included are columns for each of the fields 302, 304, 306, 352, and 354 in the first table 300 and the second table 350 of FIG. 3. Fields that do not pertain to a specific tenant are not used.

Storing of extension fields in a physical system that supports only one customer per physical system may not significantly impact system performance or otherwise hinder processes relating to system upgrades or updates, configuration backups, porting to new hardware, or the like. Supporting only one organization on a system can eliminate the need to parse master data and other features as belonging to one or another organization supported on the same system. As noted above, multi-tenancy, in which multiple organizations can be provided with a customized software solution from a single system, provides numerous benefits as well. As shown in FIG. 3 and FIG. 4, however, such an approach effectively doubles the size and complexity of the master data database table 400 just for a system hosting two customer tenants relating to two separate organizations. It can be readily understood that, in a multi-tenant architecture hosting of dozens or even hundreds of customer tenants, the size and complexity of a database table necessary to incorporate customized extension fields for each organization assigned to each of the customer tenants would be quite substantial.

Additionally, establishment of new extension fields and their associated database columns can require action by a system administrator with change control over the entire database table storing the master data. This can impose unwanted reductions in flexibility for key users at each organization supported on a customer tenant of the multi-tenant system in that modifications to business processes that result in new types of master data cannot be promptly implemented but will rather need to be requested from the system administrator. Furthermore, databases can have a maximum allowable number of columns. Addition of a new column for every new extension field of one or more customers on a physical system can cause the number of columns in a database table to approach this maximum. Very high support costs can result for a vendor or technical support provider of a database management or enterprise resource management system.

Figure 5:
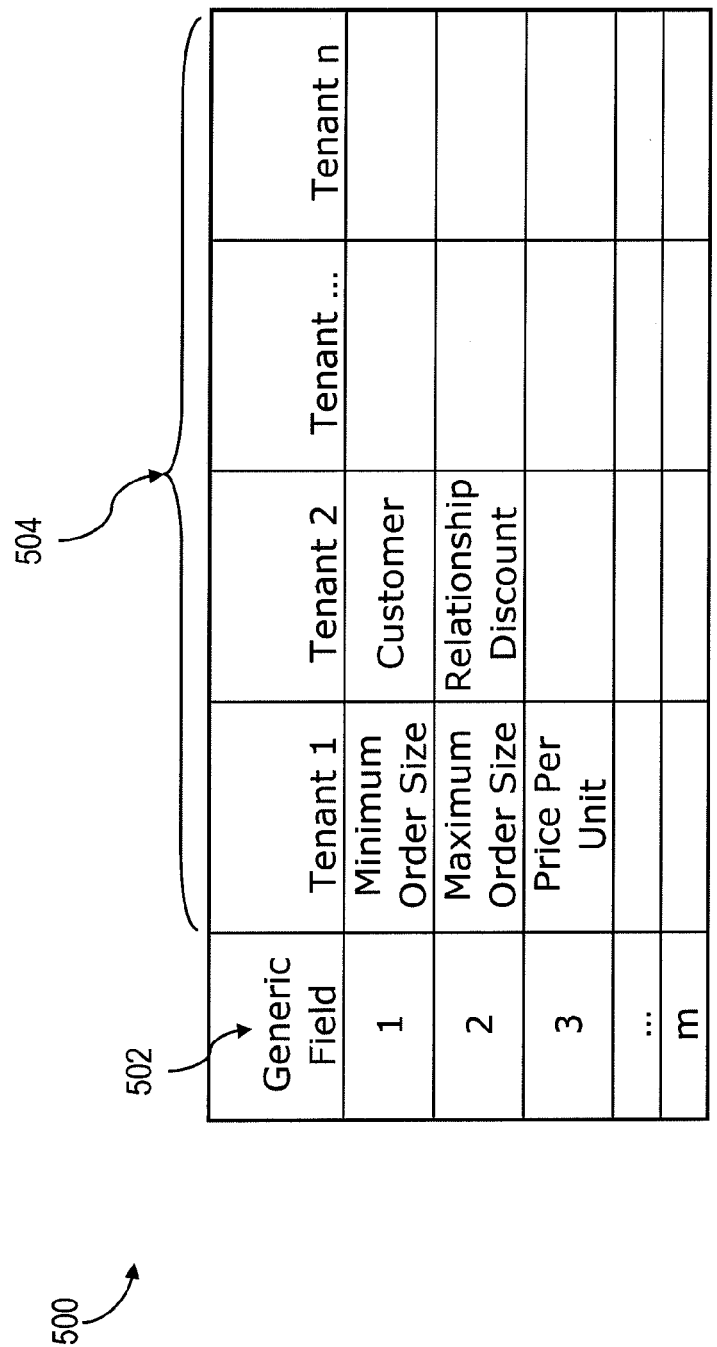
FIG. 5 shows an example of a first tenant-nonspecific database table for storing organization-specific master data in a multi-tenant architecture according to an implementation.

In one or more implementations of the current subject matter, support for extension field customization for multiple business configurations each hosted on separate customer tenants can be provided using a combination of tenant-non-specific database tables: a first tenant-nonspecific database table that stores tenant-specific definitions of one or more of a set of predefined generic fields, and a second tenant-non-specific database table that stores tenant-specific values for the one or more predefined generic fields. FIG. 5 and FIG. 6 provides an illustrative example of such a first tenant-nonspecific database table 500 and a second tenant-nonspecific database tables 600, respectively, that continue with the example scenario for the first organization and the second organization discussed above in regards to FIG. 3 and FIG. 4. The first tenant-nonspecific database table 500 shown in FIG. 5 includes a generic field label field 502 that stores a designation, identifier, etc. for each predefined generic field and a series of t tenant-specific generic field definition fields 504 that store tenant-specific definitions for each of the generic fields used by each customer tenant. The second tenant-nonspecific database table 600 shown in FIG. 6 can include a tenant label or other key value field 602, a table index or record designator field 604, and one generic field record value field 606 for each generic field.

Using an implementation current subject matter, therefore, addition of a new custom extension field is no longer an administrator-level task. Rather, a key user or other authorized operator at an organization can simply alter an existing record or create a new record for a new generic field definition in the tenant-specific generic field definition field 504 for the customer tenant assigned to his or her organization. The master data stored in the repository 114 of the multi-tenant architecture in the combination of the first tenant-nonspecific database table 500 and the second tenant-nonspecific database table 600 can be presented to users at each customer tenant as though it were stored in a format similar to that of FIG. 3.

However, in the event that a customer tenant needs to be copied or moved from one physical system hosting the multi-tenant architecture to another physical system hosting the multi-tenant architecture, the process is substantially streamlined. The tenant-specific generic field definition field 504 in the first tenant-nonspecific database table 500 for the moved or copied tenant can be copied or moved to the new system or copied customer tenant. Any records in the second tenant-nonspecific database table 600 having a value in the tenant label or other key value field 602 that corresponds to a moved customer tenant can be extracted from the second tenant-nonspecific database table 600 for transfer to a second tenant-nonspecific database table 600 at the new system. Records in the second tenant-nonspecific database table 600 having a value in the tenant label or other key value field 602 that corresponds to a customer tenant being copied to a new customer tenant on the same system can be copied and given new values for the tenant label or other key value field 602 to correspond to the new copied customer tenant.

Figure 7:
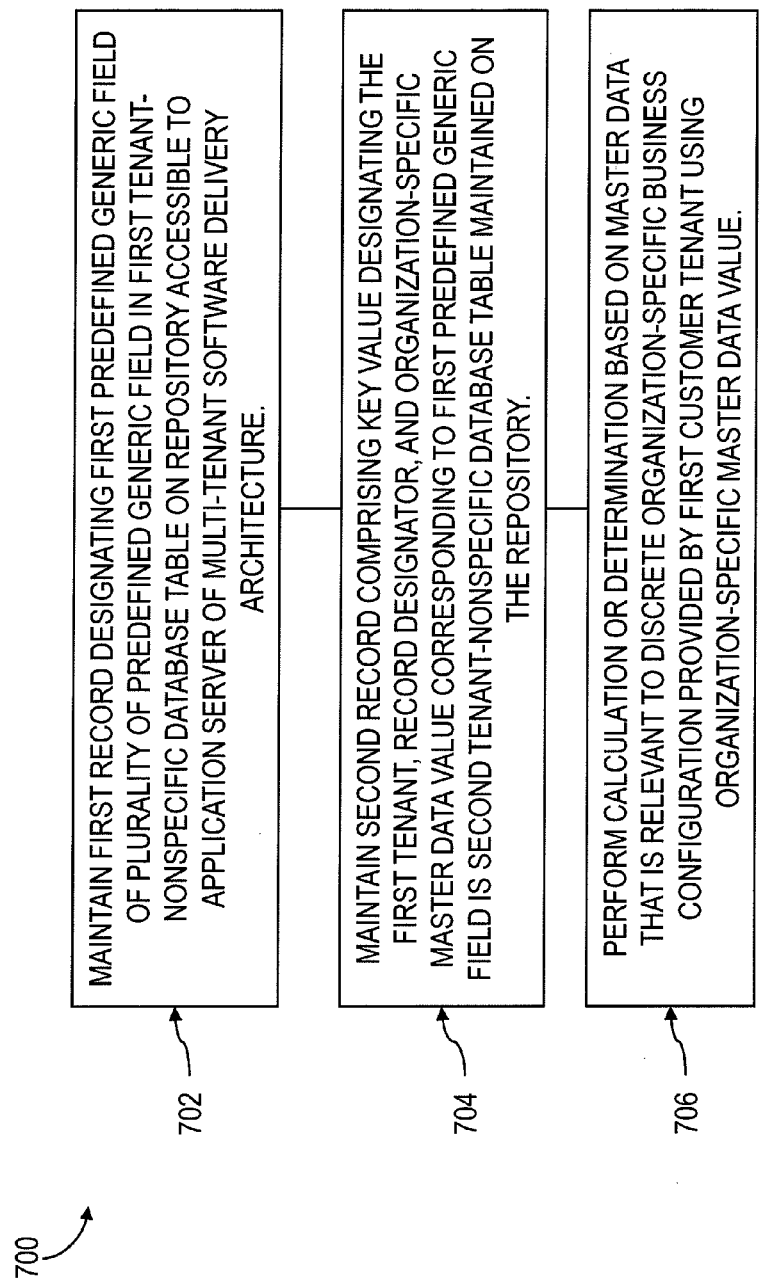
FIG. 7 is a process flow diagram illustrating a method consistent with an implementation of the current subject matter.

FIG. 7 shows a process flow chart 700 illustrating a method consistent with implementations of the current subject matter. At 702, a first record is maintained in a first tenant-nonspecific database table on a repository accessible to an application server of a multi-tenant software delivery architecture. The first record designates a first predefined generic field of a plurality of predefined generic fields and includes an organization-specific master data field definition of the first predefined generic field. The organization-specific master data field definition of the first predefined generic field is maintained in a first tenant-specific definition field assigned to a first customer tenant of a plurality of customer tenants that are accessible via the application server. Each customer tenant of the plurality of customer tenants provides a discrete organization-specific business configuration of a core software platform. At 704, a second record comprising a key value designating the first tenant, a record designator, and an organization-specific master data value corresponding to the first predefined generic field is maintained in a second tenant-nonspecific database table maintained on the repository. At 706, a calculation or determination based on master data that is relevant to the discrete organization-specific business configuration provided by the first customer tenant is performed using the organization-specific master data value.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a machine-readable medium storing instructions that, when executed by at least one processor, cause the at least one processor to perform operations comprising:

maintaining, in a first tenant-nonspecific database table on a repository accessible to an application server of a multi-tenant software delivery architecture, a first record designating a first predefined generic field of a plurality of predefined generic fields and comprising an organization-specific master data field definition of the first predefined generic field maintained in a first tenant-specific definition field assigned to a first customer tenant of a plurality of customer tenants that are accessible via the application server, each customer tenant of the plurality of customer tenants providing a discrete organization-specific business configuration of a core software platform;

maintaining, in a second tenant-nonspecific database table maintained on the repository, a second record comprising a key value designating the first tenant, a record designator, and an organization-specific master data value corresponding to the first predefined generic field; and performing a calculation or determination based on master data relevant to the discrete organization-specific business configuration provided by the first customer tenant using the organization-specific master data value.

2. A computer program product as in claim 1, wherein the operations further comprise: presenting, to an authorized user of the first customer tenant, a master data table comprising the organization-specific master data value and only other master data relevant to the first customer tenant.

3. A computer program product as in claim 2, wherein the master data table comprises a master data record having at least one master data field, the at least one master data field comprising the organization-specific master data value.

4. A computer program product as in claim 3, wherein the master data table is formed at least by extracting the organization-specific master data value associated with the key value designating the first customer tenant.

5. A computer program product as in claim 1, wherein the calculation or determination based on master data comprises a pricing calculation.

6. A computer program product as in claim 1, wherein the organization-specific master data field definition of the first predefined generic field and the corresponding organization-specific master data value are associated with a first generic field label.

7. A computer program product as in claim 1, wherein the first tenant-specific definition field identifies a data object that reflects a business process specific to the first customer tenant, the data object representing business configuration information or transaction data.

8. A system comprising:
    at least one processor; and
    a machine-readable medium storing instructions that, when executed by the at least one processor, cause the at least one processor to perform operations comprising:
    maintaining, in a first tenant-nonspecific database table on a repository accessible to an application server of a multi-tenant software delivery architecture, a first record designating a
    first predefined generic field of a plurality of predefined generic fields and comprising an organization-specific master data field definition of the first predefined generic field maintained in a first tenant-specific definition field assigned to a first customer tenant of a plurality of customer tenants that are accessible via the application server, each customer tenant of the plurality of customer tenants providing a discrete organization-specific business configuration of a core software platform;
    maintaining, in a second tenant-nonspecific database table maintained on the repository, a second record comprising a key value designating the first tenant, a record designator, and an organization-specific master data value corresponding to the first predefined generic field; and
    performing a calculation or determination based on master data relevant to the discrete organization-specific business configuration provided by the first customer tenant using the organization-specific master data value.

9. A system as in claim 8, wherein the operations further comprise: presenting, to an authorized user of the first customer tenant, a master data table comprising the organization-specific master data value and only other master data relevant to the first customer tenant.

10. A system as in claim 9, wherein the master data table comprises a master data record having at least one master data field, the at least one master data field comprising the organization-specific master data value.

11. A system as in claim 10, wherein the master data table is formed at least by extracting the organization-specific master data value associated with the key value designating the first customer tenant.

12. A system as in claim 8, wherein the calculation or determination based on master data comprises a pricing calculation.

13. A system as in claim 8, wherein the organization-specific master data field definition of the first predefined generic field and the corresponding organization-specific master data value are associated with a first generic field label.

14. A system as in claim 8, wherein the first tenant-specific definition field identifies a data object that reflects a business process specific to the first customer tenant, the data object representing business configuration information or transaction data.

15. A computer-implemented method comprising:
    maintaining, in a first tenant-nonspecific database table on a repository accessible to an application server of a multi-tenant software delivery architecture, a first record designating a first predefined generic field of a plurality of predefined generic fields and comprising an organization-specific master data field definition of the first predefined generic field maintained in a first tenant-specific definition field assigned to a first customer tenant of a plurality of customer tenants that are accessible via the application server, each customer tenant of the plurality of customer tenants providing a discrete organization-specific business configuration of a core software platform;
    maintaining, in a second tenant-nonspecific database table maintained on the repository, a second record comprising a key value designating the first tenant, a record designator, and an organization-specific master data value corresponding to the first predefined generic field; and
    performing a calculation or determination based on master data relevant to the discrete organization-specific business configuration provided by the first customer tenant using the organization-specific master data value.

16. A computer-implemented method as in claim 15, further comprising: presenting, to an authorized user of the first customer tenant, a master data table comprising the organization-specific master data value and only other master data relevant to the first customer tenant.

17. A computer-implemented method as in claim 16, wherein the master data table comprises a master data record having at least one master data field, the at least one master data field comprising the organization-specific master data value.

18. A computer-implemented method as in claim 17, wherein the master data table is formed at least by extracting the organization-specific master data value associated with the key value designating the first customer tenant.

19. A computer-implemented method as in claim 15, wherein the organization-specific master data field definition of the first predefined generic field and the corresponding organization-specific master data value are associated with a first generic field label.

20. A computer-implemented method as in claim 15, wherein the first tenant-specific definition field identifies a data object that reflects a business process specific to the first customer tenant, the data object representing business configuration information or transaction data.

* * * * *